US012644752B2

(12) United States Patent
Siegfried

(10) Patent No.: US 12,644,752 B2
(45) Date of Patent: Jun. 2, 2026

(54) SENSOR INTERFACE TECHNOLOGY

(71) Applicant: Independent Technologies , LLC, Blair, NE (US)

(72) Inventor: Tim Siegfried, Blair, NE (US)

(73) Assignee: Independent Technologies, LLC, Blair, NE (US)

( * ) Notice: Subject to any disclaimer, the term of this patent is extended or adjusted under 35 U.S.C. 154(b) by 311 days.

(21) Appl. No.: 17/500,579

(22) Filed: Oct. 13, 2021

(65) Prior Publication Data

US 2023/0111405 A1 Apr. 13, 2023

(51) Int. Cl.
| | |
|---|---|
| *G01F 23/80* | (2022.01) |
| *G01F 23/00* | (2022.01) |
| *G01F 23/36* | (2006.01) |
| *G01F 25/20* | (2022.01) |

(52) U.S. Cl.
CPC ........ *G01F 23/802* (2022.01); *G01F 23/0046* (2013.01); *G01F 23/363* (2013.01); *G01F 25/20* (2022.01)

(58) Field of Classification Search
CPC .. G01F 23/802; G01F 23/0046; G01F 23/363; G01F 25/20; G01F 23/0023; G01F 23/18; G01F 23/804
See application file for complete search history.

(56) References Cited

U.S. PATENT DOCUMENTS

| | | | | |
|---|---|---|---|---|
| 10,731,895 B2 * | 8/2020 | Young | ................... | F24H 15/223 |
| 2016/0097414 A1 * | 4/2016 | Sabo | ...................... | F16B 7/042 |
| | | | | 403/351 |

| | | | | |
|---|---|---|---|---|
| 2019/0077651 A1 * | 3/2019 | Rigdon | ..................... | F17C 5/02 |
| 2020/0264607 A1 * | 8/2020 | Smith | .................. | G05D 1/0276 |
| 2021/0096006 A1 * | 4/2021 | Maguire | ............. | G01F 23/0007 |

OTHER PUBLICATIONS

Satoru Fujita, Kenji Fujiwara, Jiro Sumita, Yoshitaka Konya and Seiichi Muroyama. "Automatic Oil Leak Detection System for an Underground Tank ," published by 21st International Telecommunications Energy Conference. INTELEC '99 (Cat. No. 99CH37007) (p. 329). (Year: 1999).*
Bruce M. Howe and Timothy McGinnis."Sensor Networks for Cabled Ocean Observatories," published by 2003 International Conference Physics and Control. Proceedings (Cat. No. 03EX708) (pp. 216-221). (Year: 2003).*

* cited by examiner

*Primary Examiner* — Lee E Rodak
*Assistant Examiner* — Sangkyung Lee
(74) *Attorney, Agent, or Firm* — Rita C. Chipperson, Esq.; Chipperson Law Group, P.C.

(57) ABSTRACT

A universal sensor interface system includes a sensor assembly and an adapter with twist to lock and twist to unlock functionality. The sensor assembly has a sensor interface box and a transducer communicatively connected to the sensor interface box by a cable. The adapter is configured to connect to an access aperture of a container for holding a fluid. The sensor interface box has a first connection interface, and the adapter has a complementary second connection interface. The first connection interface and the second connection interface cooperate to facilitate connection of the sensor assembly to the access aperture of the container and disconnection of the sensor assembly from the access aperture of the container.

21 Claims, 18 Drawing Sheets

SENSOR INTERFACE TECHNOLOGY

COPYRIGHT NOTICE

BACKGROUND OF THE INVENTION

Field of the Invention

The present invention relates, generally, to mechanical and electro-mechanical sensors, transducers, and other monitoring devices, and adapters and other interface devices. More particularly, the invention relates to a universal system for connecting a sensor (and attached interface box) of a variety of types to a container that holds a variety of materials. Most particularly, the invention relates to a tank monitoring system, apparatus and method for releasably coupling a sensor and attached interface box to a tank holding a liquid. The invention is especially suitable for enabling quick, easy, and efficient attachment of a liquid level interface box and sensor to the fill port of a tank holding a liquid, for quick removal for filling the tank with liquids such as chemicals, oils, lubricants and fuels, and for quick and secure re-attachment of the sensor and interface box to the tank. The techniques of the invention can also be used in other fields utilizing a variety of sensors, containers, and materials (liquid, gas and/or solids) disposed and monitored in such containers.

Background Art

Existing products and technology are believed to have significant limitations and shortcomings.

For these and other reasons, a need exists for the present invention.

All US patents and patent applications, and all other published documents mentioned anywhere in this application are hereby incorporated by reference in their entirety.

BRIEF SUMMARY OF THE INVENTION

The present invention provides a sensor interface apparatus, method of use of the sensor interface, and method of making the sensor interface.

In one embodiment, the invention provides a sensor interface box and adapter system which serves as a universal means of connecting a monitoring device to a container, which can be used with a variety of mediums and with a variety of containers utilizing a variety of access apertures or means. The system of the invention is practical, reliable, safe, and efficient. The system of the invention is believed to fulfill a need and to constitute an improvement over the background technology.

In one aspect, the invention provides a sensor system, comprising a sensor assembly and an adapter, the sensor assembly having a sensor interface box and a transducer communicatively connected to the sensor interface box by a cable, the adapter being configured to connect to an access aperture of a container for holding a fluid, the sensor interface box further having a first connection interface, the adapter having a complementary second connection interface, whereby the first connection interface and the second connection interface cooperate to facilitate connection of the sensor assembly to the access aperture of the container and disconnection of the sensor assembly from the access aperture of the container.

In another aspect, the invention provides a universal liquid fill level sensor system for tank monitoring having a liquid fill aperture, the sensor system being deployable in the liquid fill aperture, comprising a sensor assembly having a sensor interface box and a transducer communicatively connected to the sensor interface box by a cable, the sensor interface box including an upper housing member and a lower member connected to the upper member; an adapter configured to be fixedly connected to the liquid fill aperture of the tank, the adapter including a tubular member for engagement with the fill aperture of the container and a flange member connected to the tubular member; the sensor interface box having a first connection interface disposed in the lower member, the first connection interface including at least two tabs disposed on the lower member of the controller housing; the adapter having a complementary second connection interface including at least four slots, each slot having an L-shaped configuration with a vertical channel member and an interconnected horizontal channel member; and whereby the first connection interface tabs and the second connection interface slots cooperate to facilitate connection of the sensor assembly to the access aperture of the container and disconnection of the sensor assembly from the access aperture of the container, without removing the adapter from the tank.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

DETAILED DESCRIPTION OF THE INVENTION

Figure 1A:
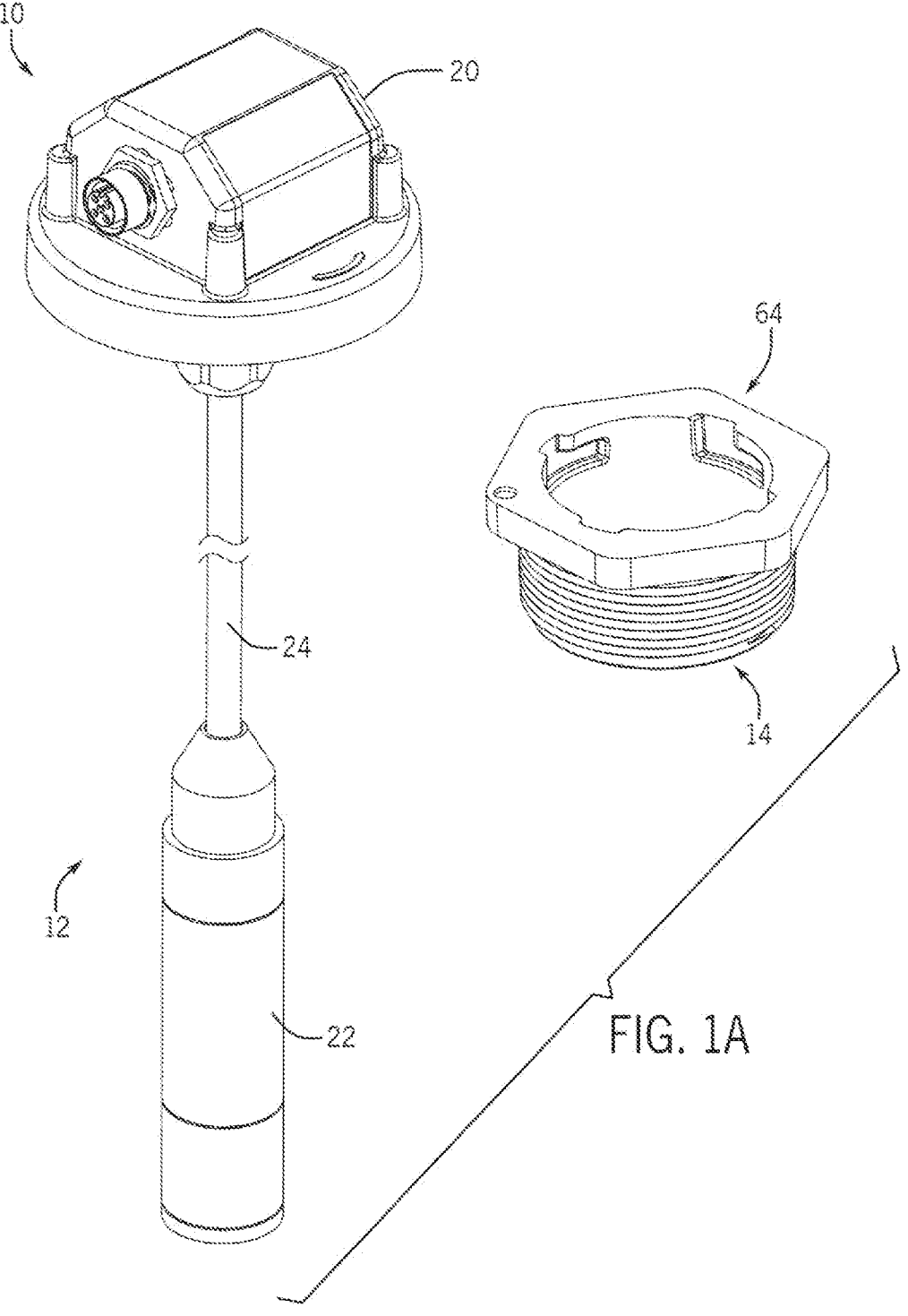
FIG. 1A illustrates the principal features of an embodiment of the sensor interface system of the present invention, namely a sensor assembly and an adapter.

The description that follows describes, illustrates and exemplifies one or more embodiments of a sensor interface system. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers in cases where such labeling facilitates a clearer description. Additionally, the drawings set forth herein are not necessarily drawn to scale. and in some instances, proportions may have been exaggerated to more clearly depict certain features.

Figure 5:
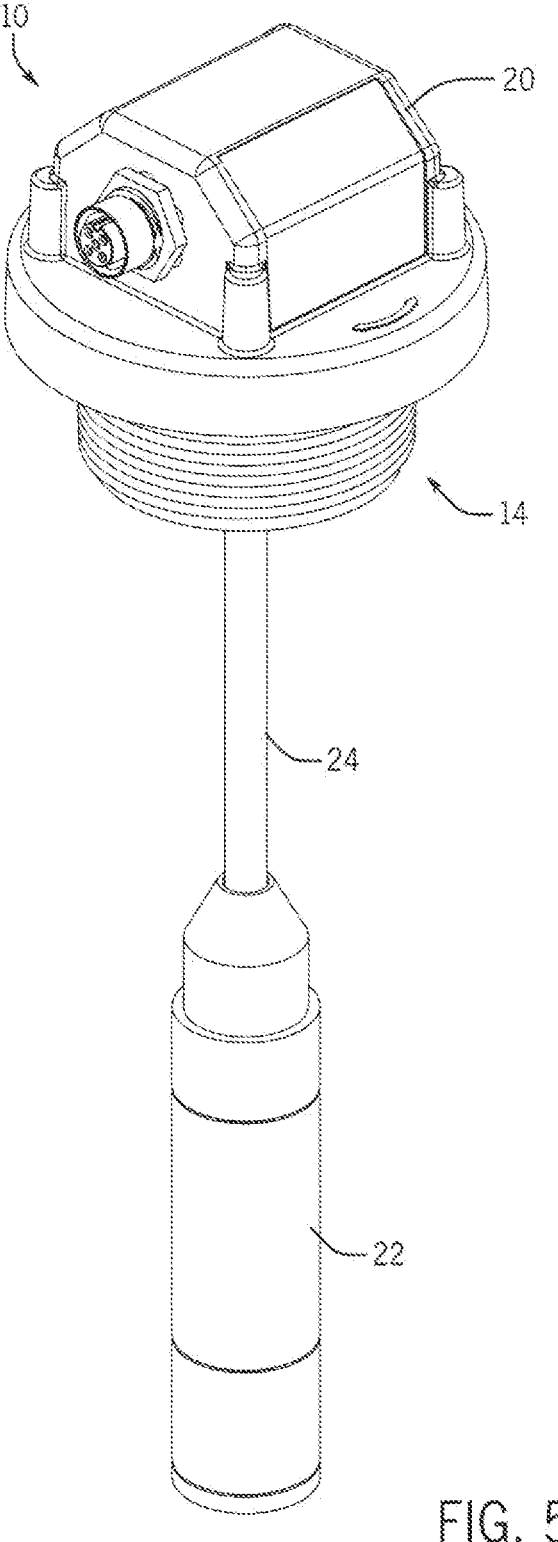
FIG. 5 is a perspective view, from the top, of the interconnected elements of the sensor interface system.
Figures 6A, 6B:
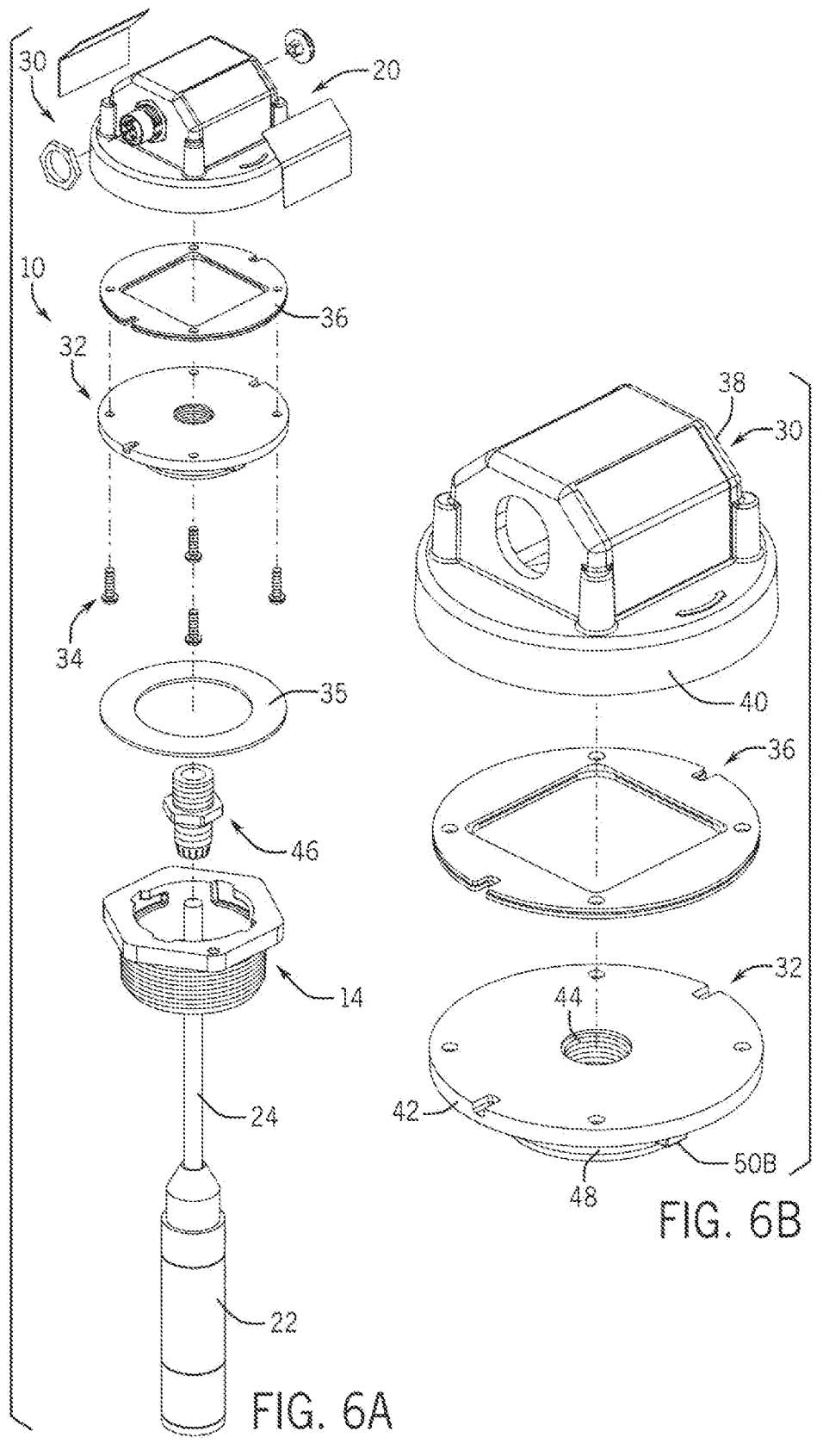
FIG. 6A is an exploded view of the interconnected elements of the sensor interface system.
FIG. 6B is an exploded view of the interconnected elements of the sensor interface box.
Figure 7:
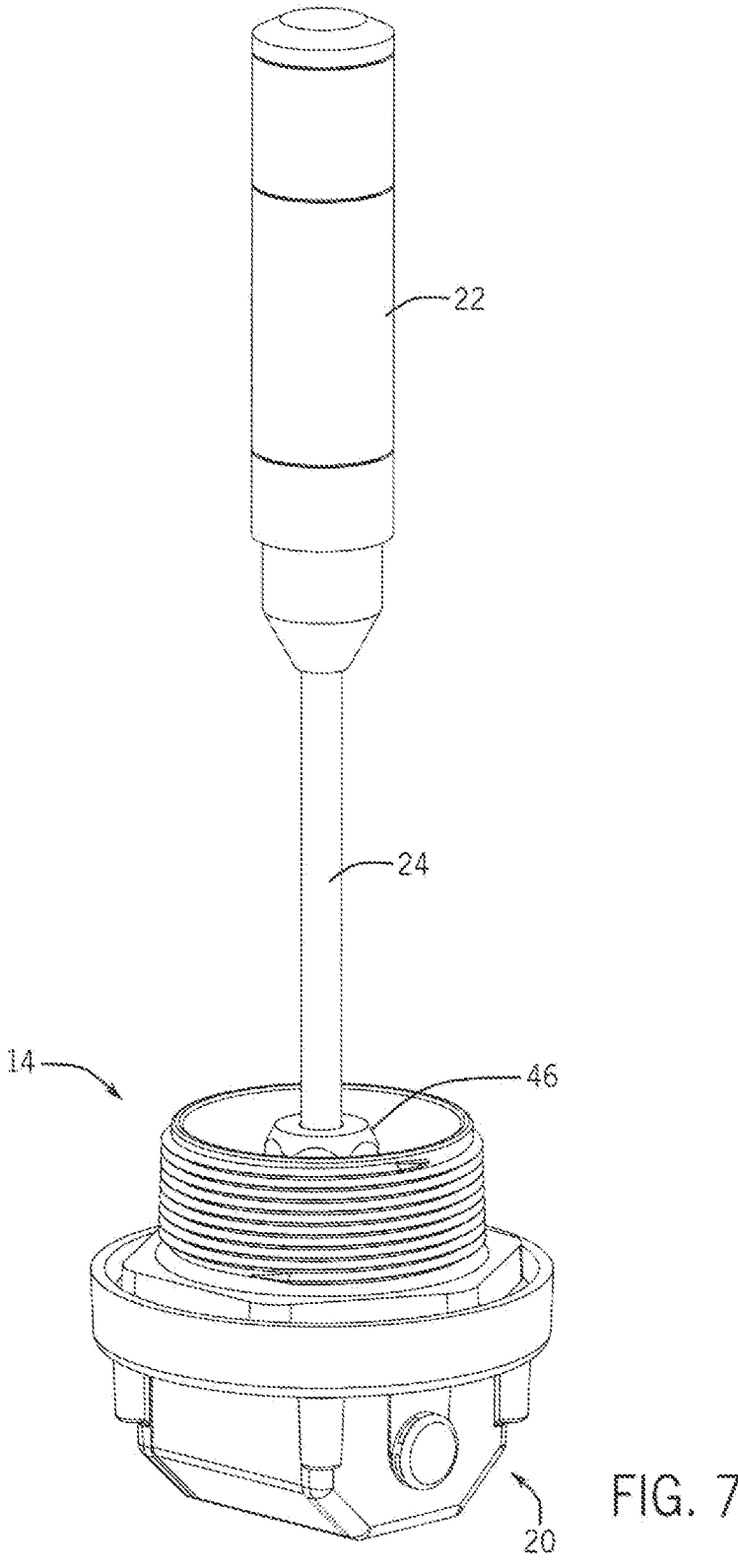
FIG. 7 is a perspective view, from the bottom, of the interconnected elements shown in FIG. 5.
Figure 8:
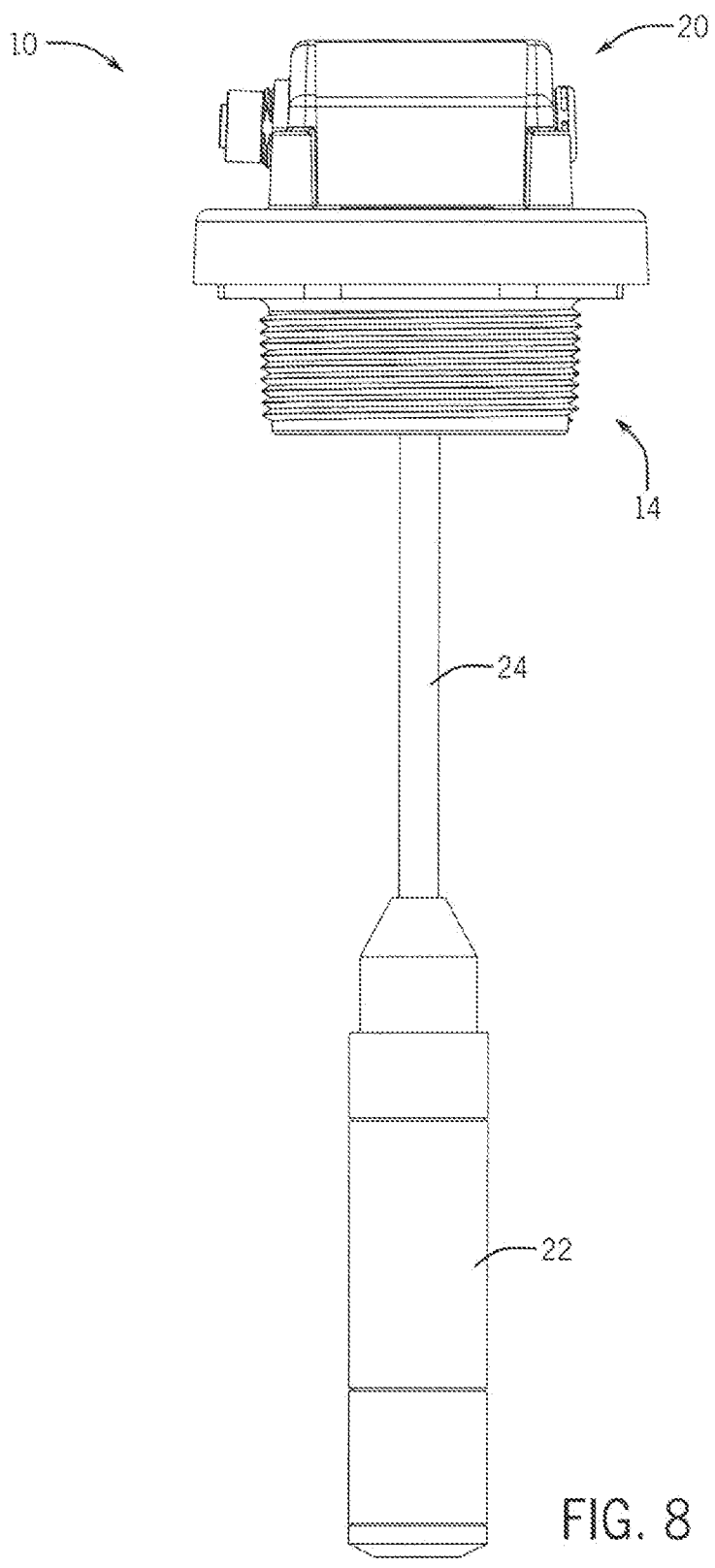
FIG. 8 is a front elevation view of the system.
Figure 9:
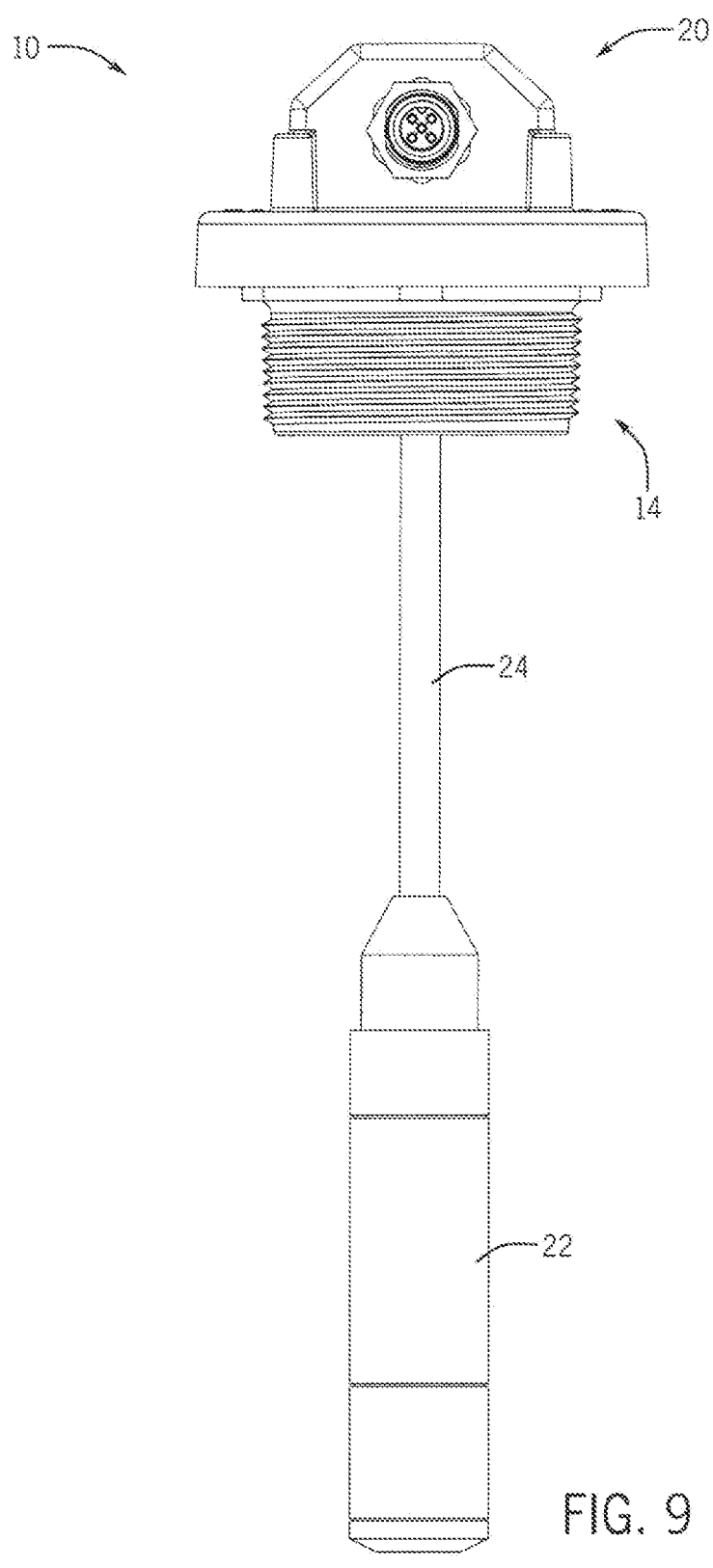
FIG. 9 is a first side elevation view of the system.
Figure 10:
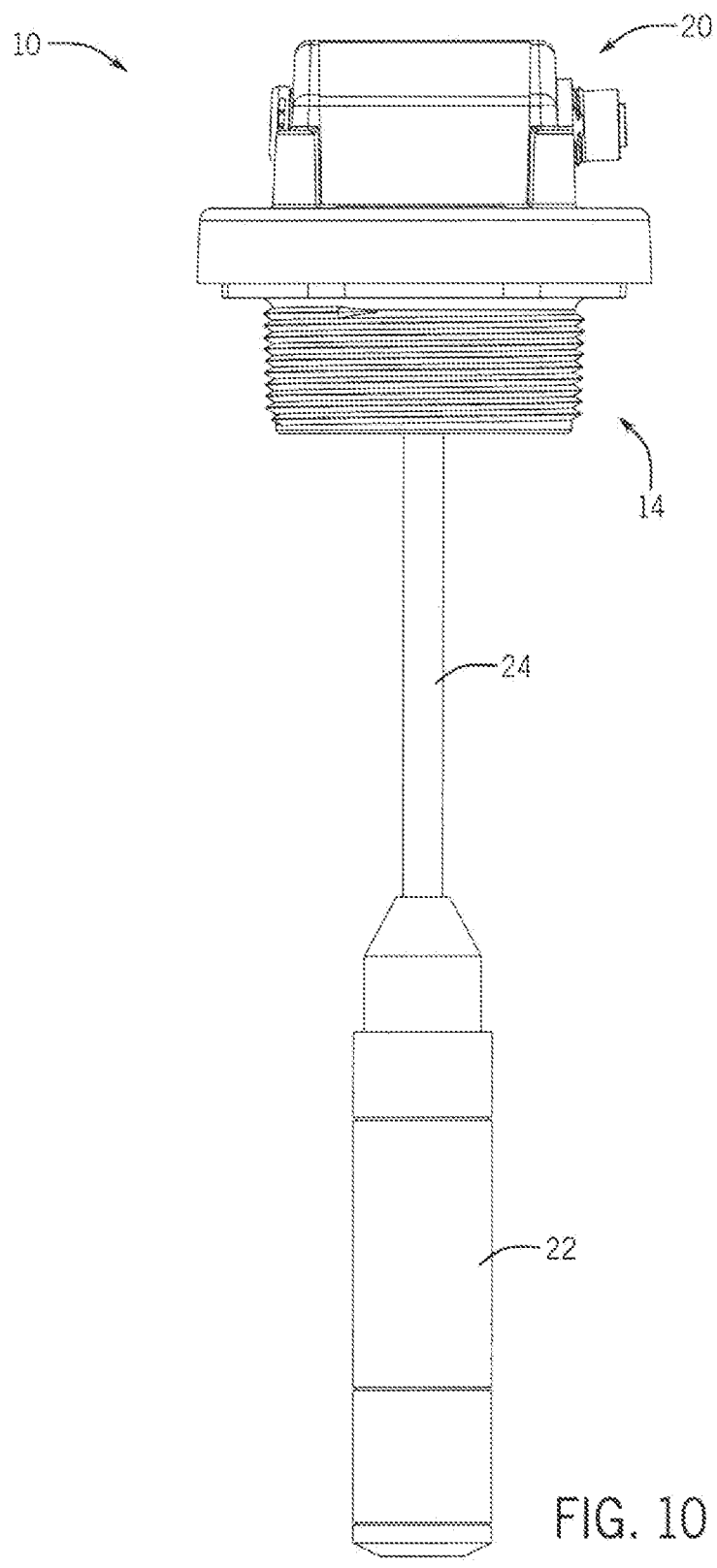
FIG. 10 is a rear elevation view of the system.
Figure 11:
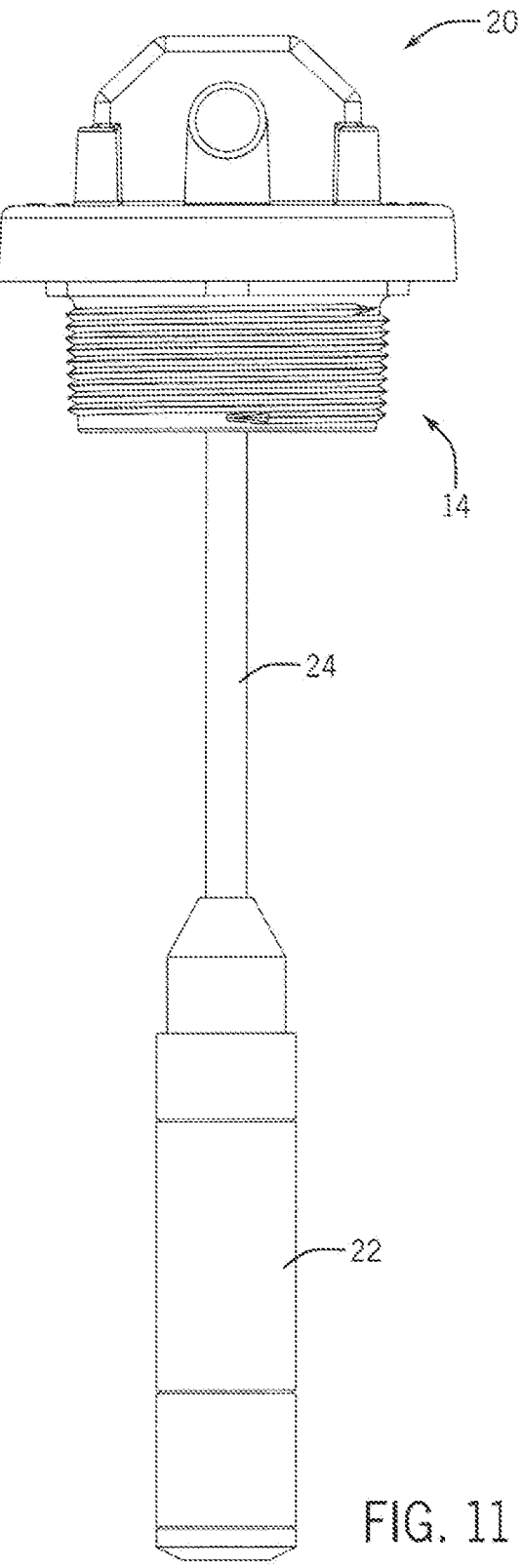
FIG. 11 is a second side elevation view of the system.
Figure 12:
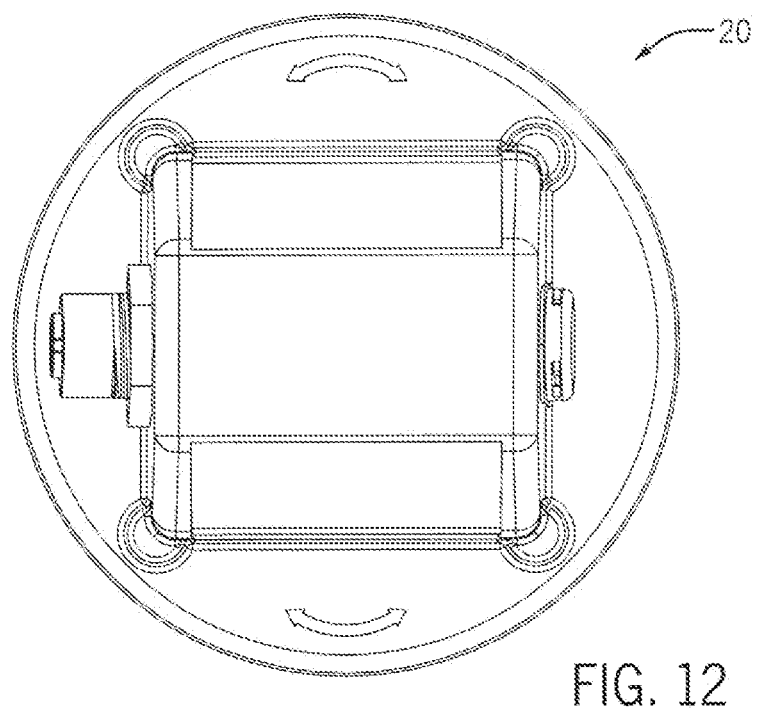
FIG. 12 is a top view of the system.
Figure 13:
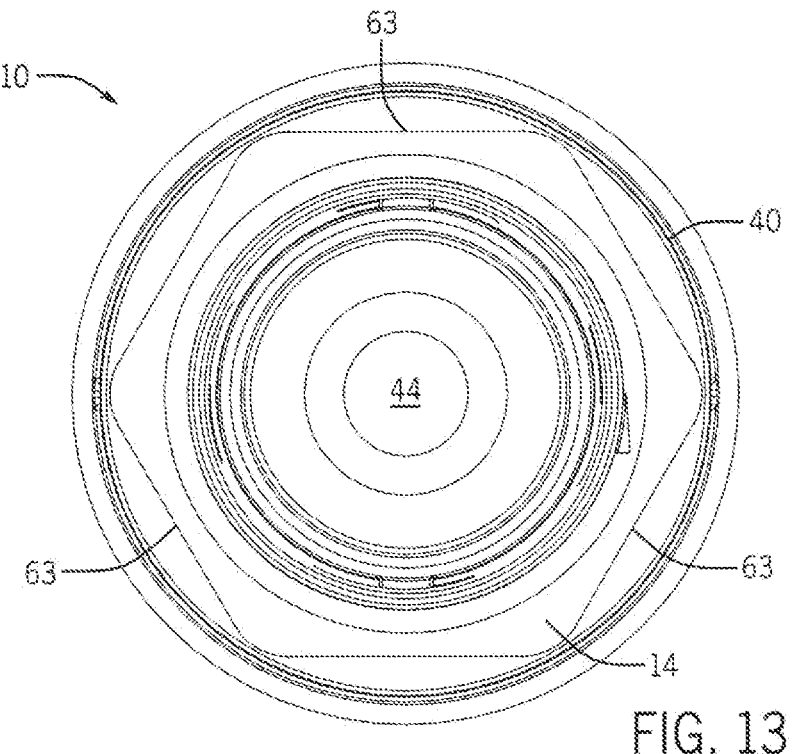
FIG. 13 is a bottom view of the system.
Figure 14:
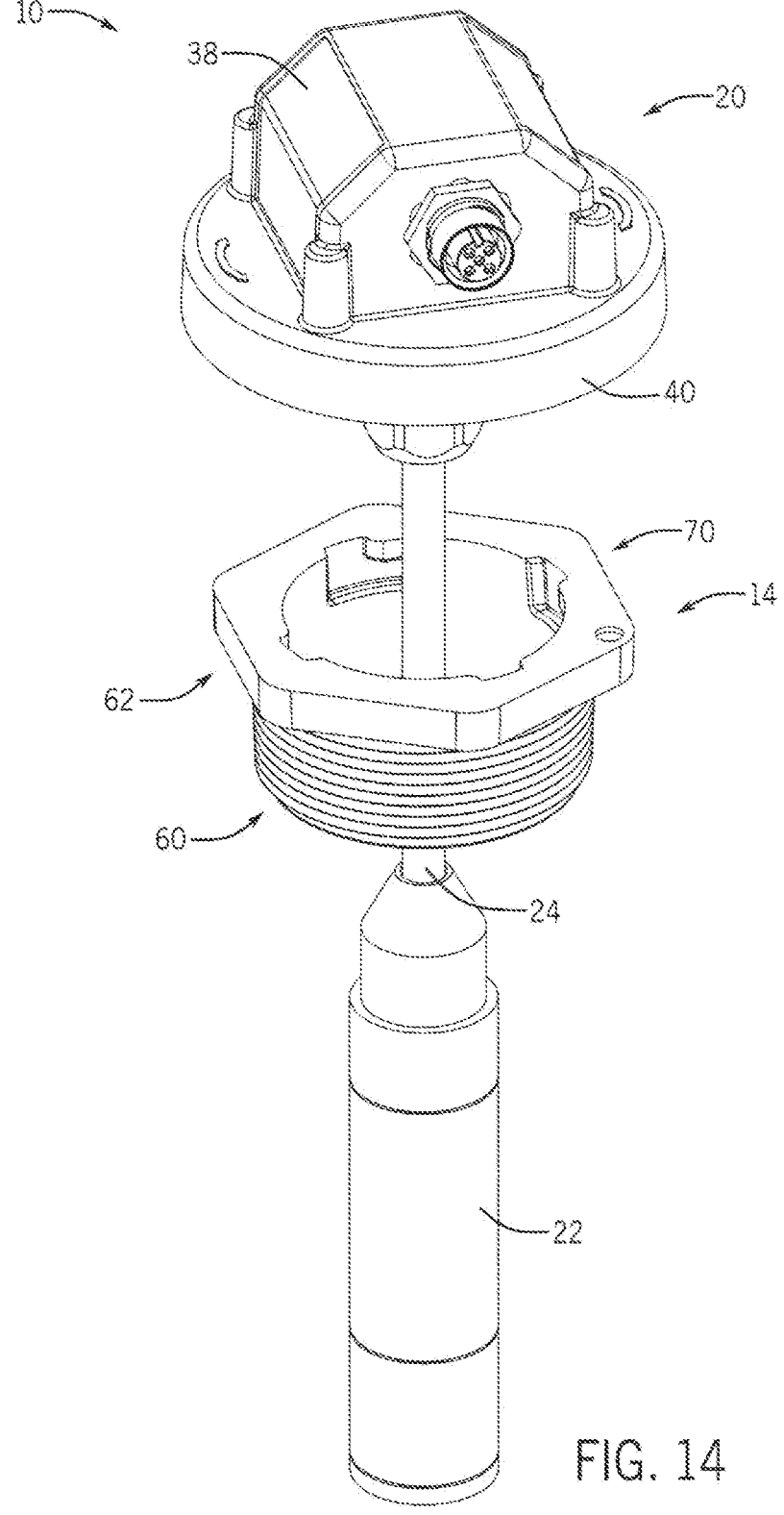
FIG. 14 is a perspective view, from the top, of principal elements of the system in the process of being interconnected.

Referring first to FIGS. 1A and 5, a universal sensor interface system 10 is provided. The sensor interface system 10 is especially suitable for enabling quick, easy, reliable, and safe attachment of a liquid level monitoring apparatus (for example a sensor interface box 20) to the fill port 16 of a tank 18, for quick removal of the box 20 to permit filling of the tank 18 with liquid fuel through the entry or fill port 16, and for subsequent quick and easy re-attachment of the box 20 to the tank 18. FIG. 1A best shows the principal components of the system 10, including a sensor interface assembly 12 and an adaptor 14. Referring also to the exploded view of the system 10 in FIG. 6A, the sensor interface assembly 12 includes a sensor interface box 20 and a transducer 22 communicatively connected to the sensor interface box 20 by a cable 24. The sensor interface box 20 contains means for monitoring and/or measuring one or more parameters of liquid contained within the tank 18 or other container. Such means for monitoring may be active or passive components and may include hardware and/or software components. Such parameters may include the amount, volume, or level of liquid within the tank. The parameters may also include time information, temperature information, pressure information, and the like. Various sensors may be used to accommodate different containers and mediums.

Figure 1B:
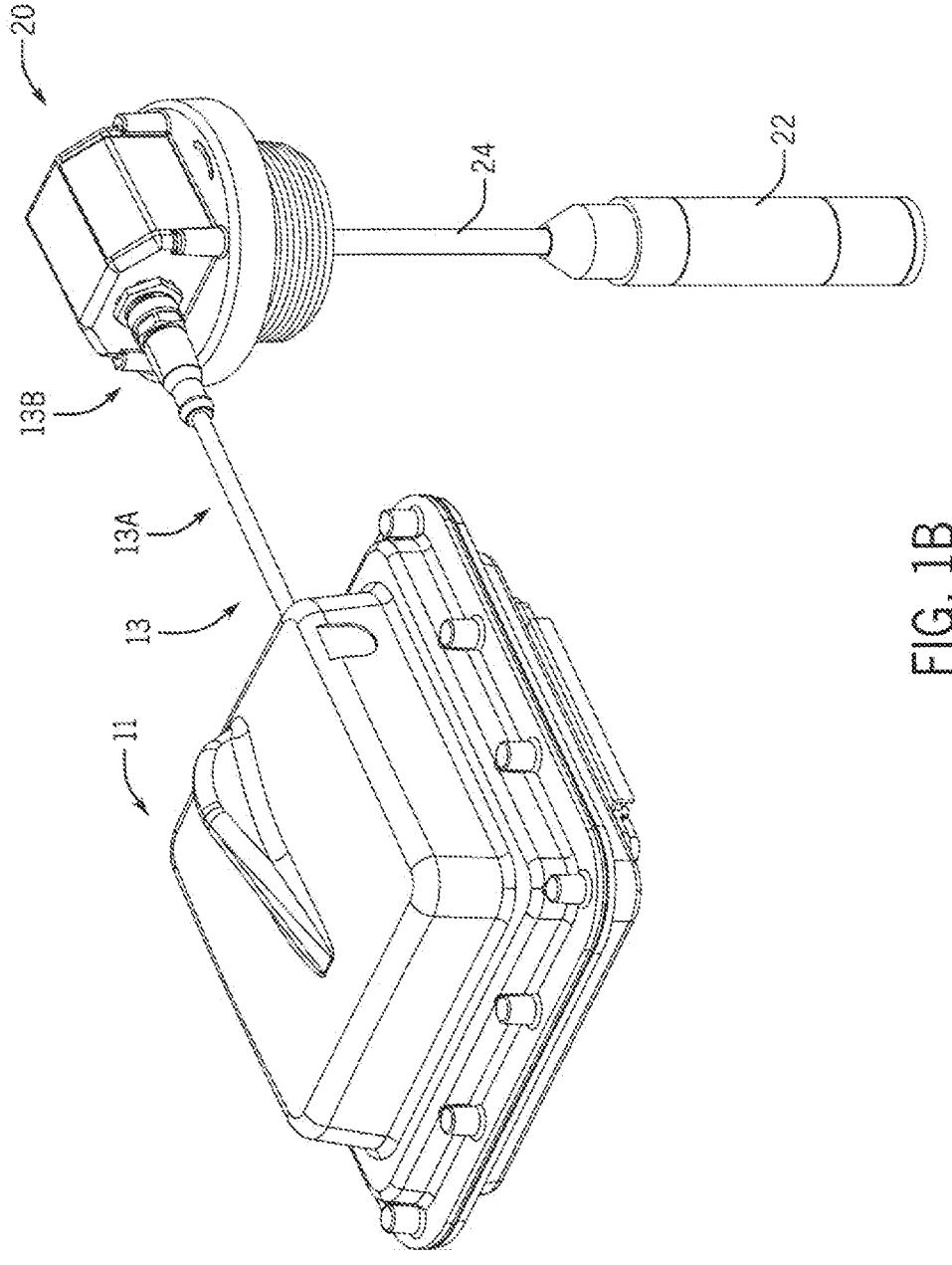
FIG. 1B shows an embodiment of the sensor interface system further including a communication unit communicatively connected to the sensor assembly.

The sensor interface box 20 may also contain a power supply to provide power to the measurement components. The sensor interface box 20 may further contain electronic communication circuitry, such as a Radio Frequency (RF) transmitter and/or receiver, to send communication signals to a remote device or facility pertaining to the tank parameters. The circuitry may also be based on Satellite, Cellular, Bluetooth, or other communication means. In some embodiments, the sensor interface box 20 may also include display means to permit a local user to view parameters of the tank 18 and fluid contents. Referring to FIG. 1B, in yet another embodiment, the sensor interface box 20 may be connected to a remote tank monitor communication unit 11 via a cable 13A and connector 13B (preferably an M12 connector) or other means. The remote communication unit 11 may be satellite, cellular or RF based and may transmit and receive information to and from a remote location such as the tank owner and/or a fuel or other liquid supplier. Exemplary communication units 11 useable with the system 10 are manufactured and sold by Applicant under the brand name ANOVA® and include the RTM Remote Tank Monitor, the CTM Cellular Tank Monitor, the LTM LPWAN Tank Monitor, and the STM Satellite Tank Monitor. Although a cable 13 connection is shown, it is within the purview of the invention that a transducer could be mounted by an alternative means. such as a radar sensor.

Figure 15:
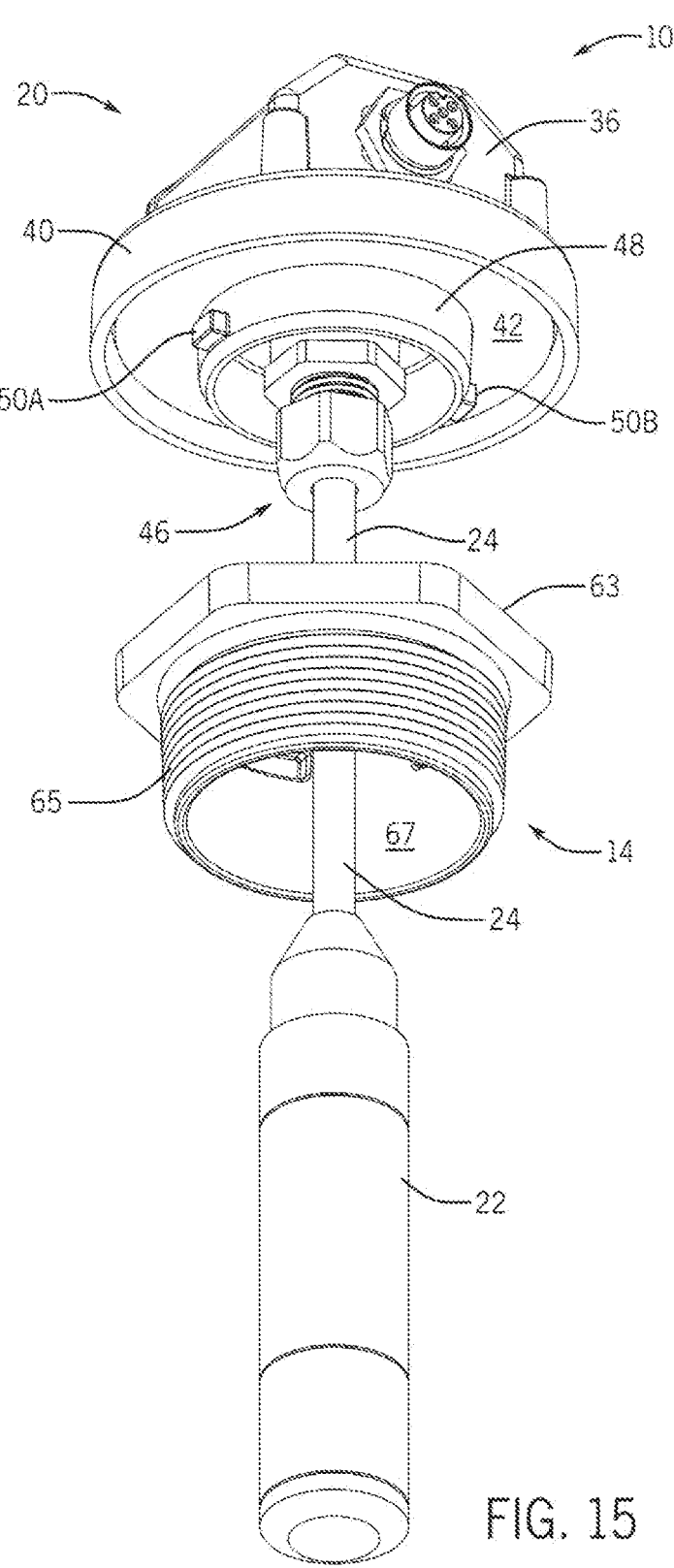
FIG. 15 is a perspective view, from the bottom, of the principal elements of the system in the process of interconnection.
Figure 16:
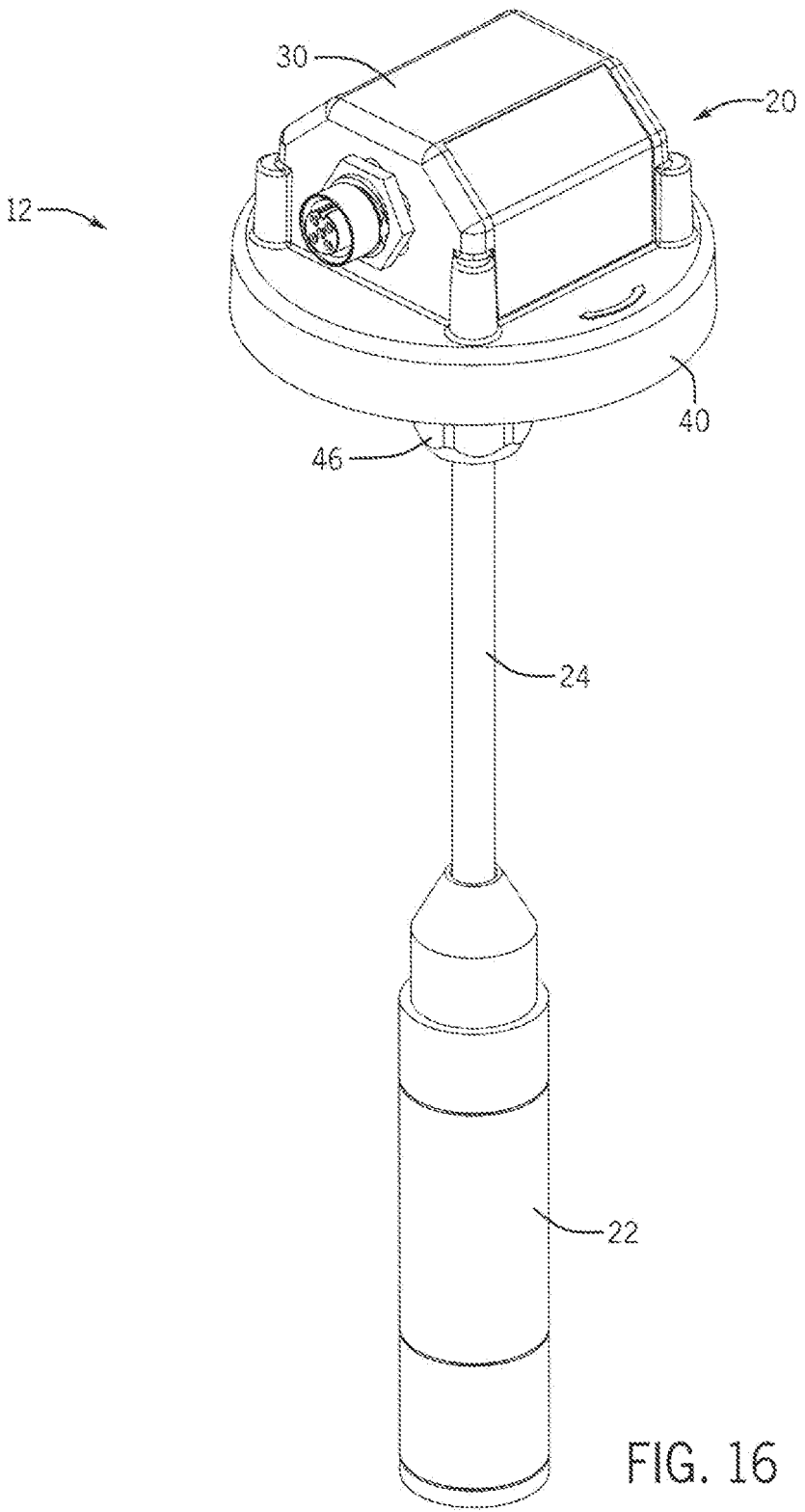
FIG. 16 is a perspective view, from the top, of an embodiment of a sensor box assembly of the system.
Figure 17:
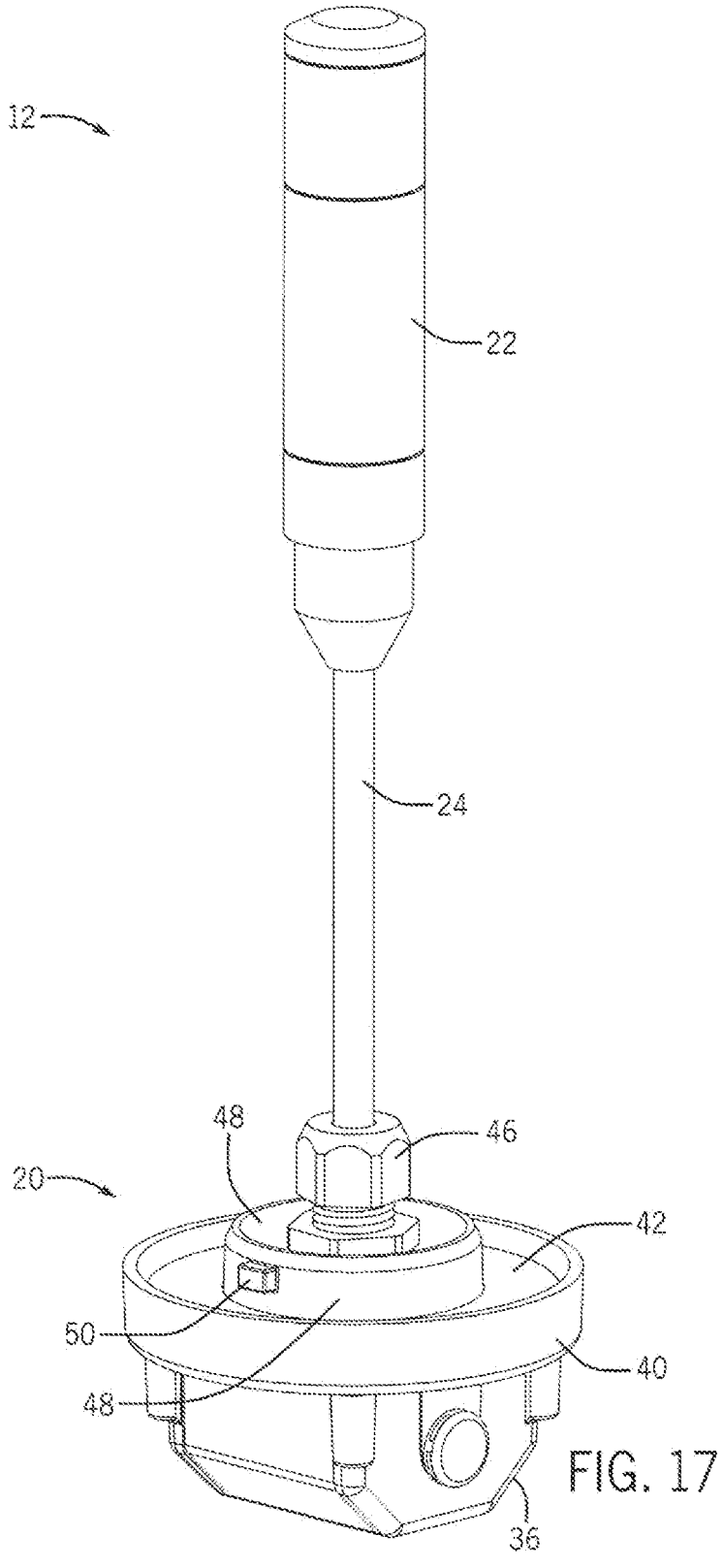
FIG. 17 is a perspective view, from the bottom, of the sensor box assembly of the system.

The sensor interface box 20 preferably comprises an upper member 30 and a lower member 32, enclosing a space for disposition of the monitoring means. The upper and lower members 30 and 32 are fastened together by screws 34 or other fastening means. A circular gasket 36 is preferably disposed between the upper and lower members 30 and 32 to provide a waterproof seal. The upper and lower members 30 and 32 may be constructed of waterproof and impact resistant plastic material. In the preferred embodiment, the upper member 30 has top portion 38 and a circular lower shroud portion 40 which overhangs the mating surface for added protection against water and other contaminant ingress. The top portion 38 as shown is approximately 3.3×1.8 inch and is preferably constructed of a high impact resistance, chemical resistant, lightweight polycarbonate material with a UV inhibitor such that it is suitable for outdoor use. The lower member 32 (and the adapter 14) is preferably constructed of polypropylene such that it is lightweight, resistant to chemicals, and has good tensile strength. However, in applications where the medium being monitored may be incompatible with polypropylene, other material may be used to mold these parts. The shroud portion 40 has an inside diameter that corresponds to the outside diameter of a circular top portion 42 of the lower member 32. and to gasket 36. Lower member 32 has an aperture 44 preferably disposed in its center, which permits electrical wiring from the sensor 22 to connect to the sensor interface box 20 hardware. The aperture 44 is preferably threaded and mates with a threaded sealing cord grip 46. Communication cord 24 sealingly extends through the cord grip 46. Significantly, lower member 32 has a lower portion 48 that has a predetermined configuration for mating with the adapter 14. Upper and lower portions 42 and 48 of the lower member 32 are preferably constructed in a unitary, one-piece fashion, with the lower portion 48 extending downwardly from the upper portion 42. Referring also to FIGS. 15 and 17, the lower portion 48 has a circular ring-like configuration with a predetermined depth and a predetermined outside diameter. A pair of tabs 50A and 50B are disposed on opposing sides of the lower portion 48. The lower portion 48 and tabs 50A/B thereof mate with corresponding features of the adapter 14, described below, to facilitate quick, easy. secure and safe connection and disconnection of the sensor interface box 20 from the adapter 14. The sensor interface box 20 also preferably has a vent that permits accurate differential pressure readings for a given tank 18.

The transducer 22 is preferably a pressure-type transducer that converts mechanical pressure due to liquids inside the tank 18 into electrical signals, which are communicated to the hardware or other monitoring means in the sensor interface box 20 via cable 24. However, it is within the purview of the invention that many types of transducers may be useable with the sensor interface system 10, including, but not limited to mechanical, electrical, electro-mechanical, hydraulic, or pneumatic type transducers. Such various transducers may detect pressure, temperature, and/or other parameters of the tank and/or tank contents. The cable 24 may be of any length which necessary to deploy, orient, stably hold the transducer 22 in an operative position within the tank 18 and with respect to the fluid in the tank 18, and to retrieve the transducer 22 from the tank 18.

Figure 18:
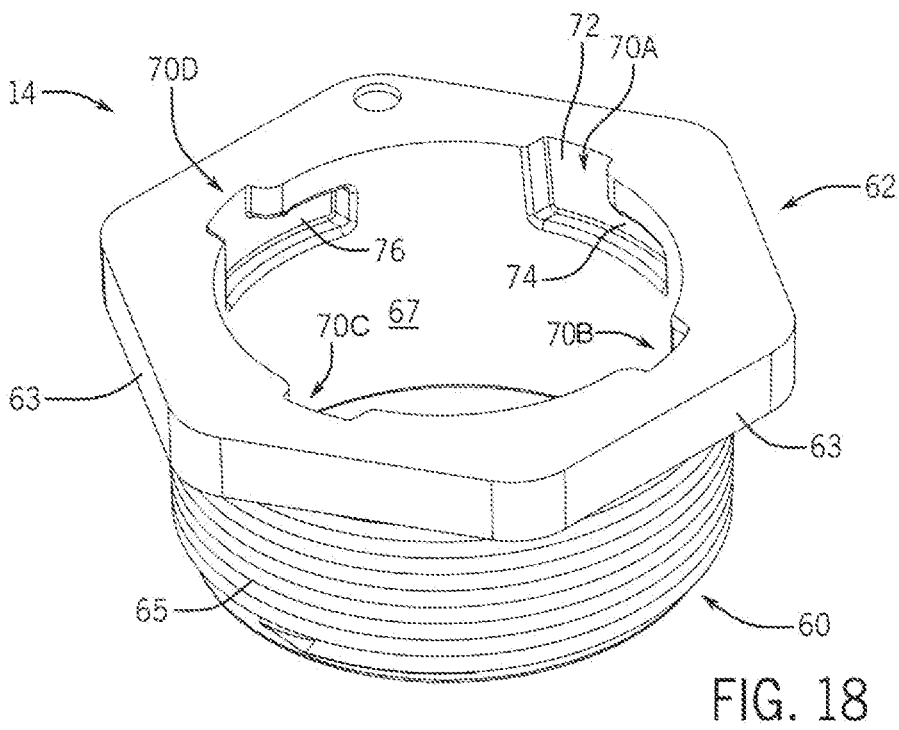
FIG. 18 is a perspective view, from the top, of an embodiment of an adapter of the system.
Figure 19:
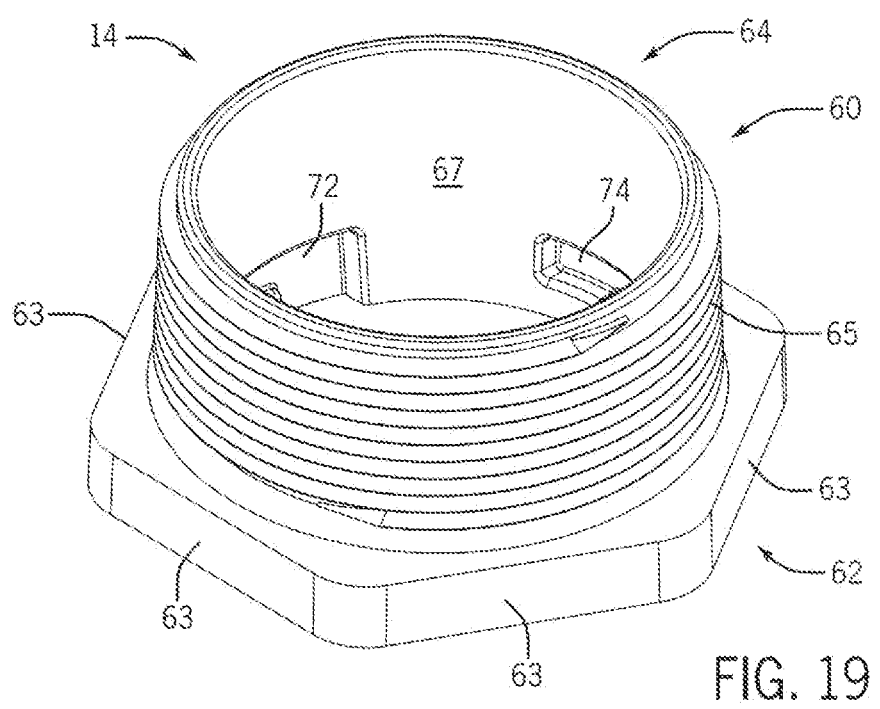
FIG. 19 is a perspective view, from the bottom, of the adapter of the system.
Figure 20:
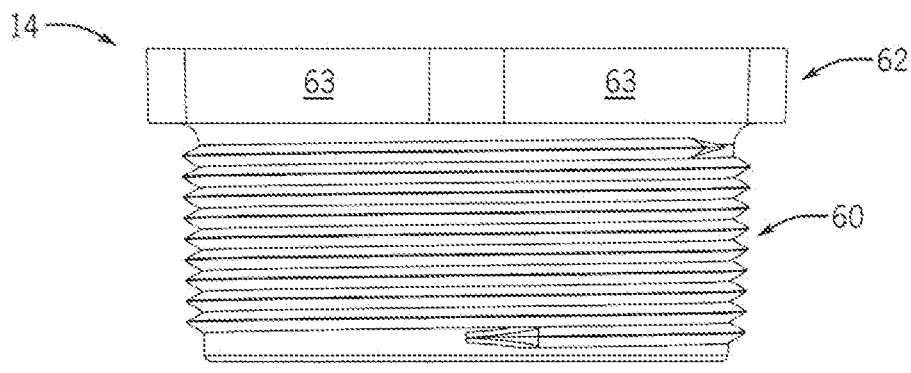
FIG. 20 is a side elevation view of the adapter.
Figure 21:
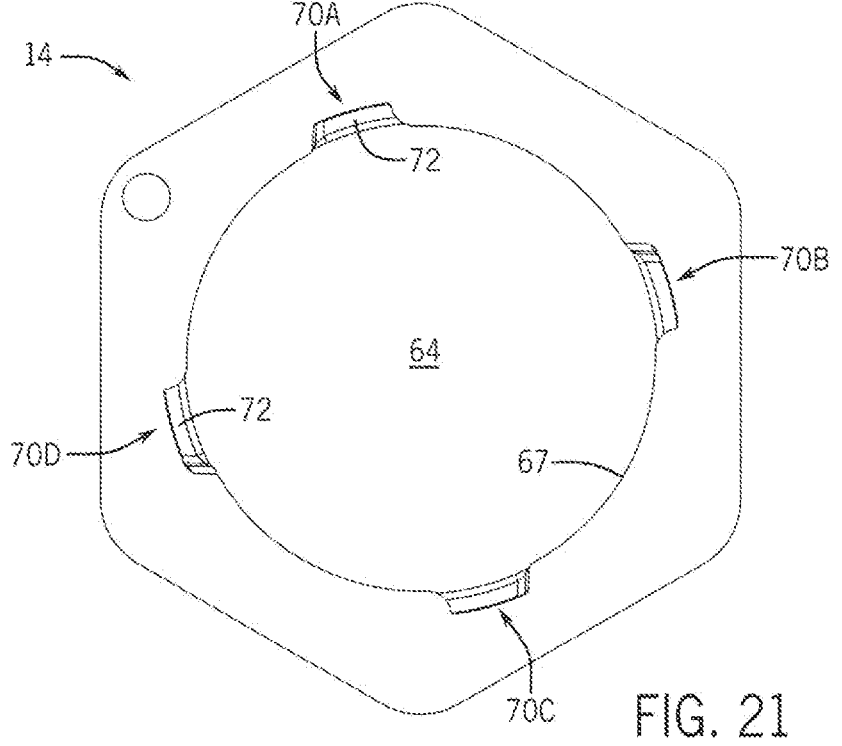
FIG. 21 is a top view of the adapter.
Figure 22:
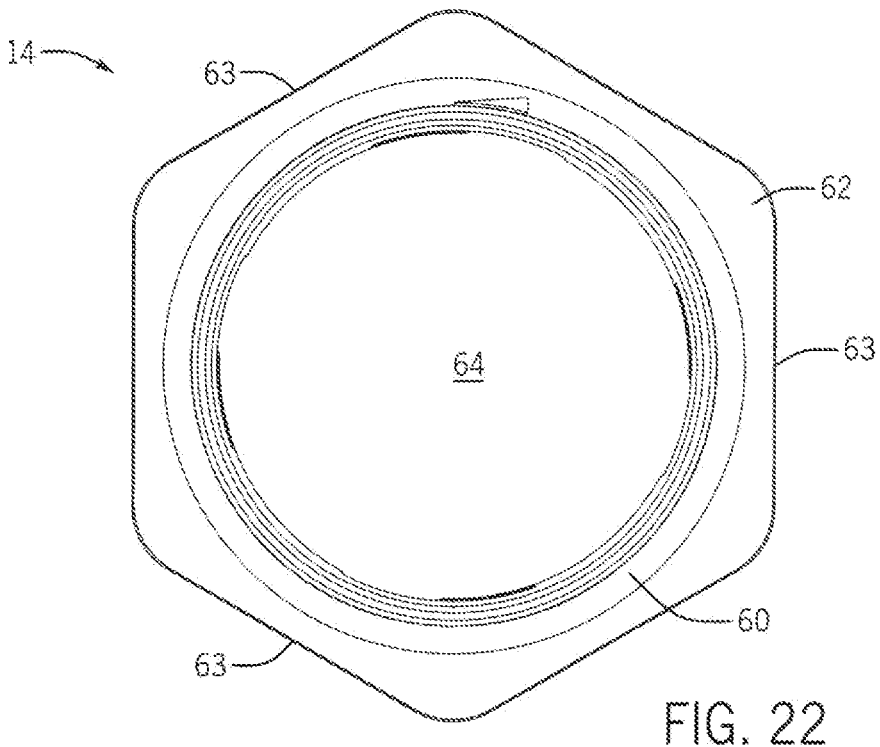
FIG. 22 is a bottom view of the adapter.
Figure 23:
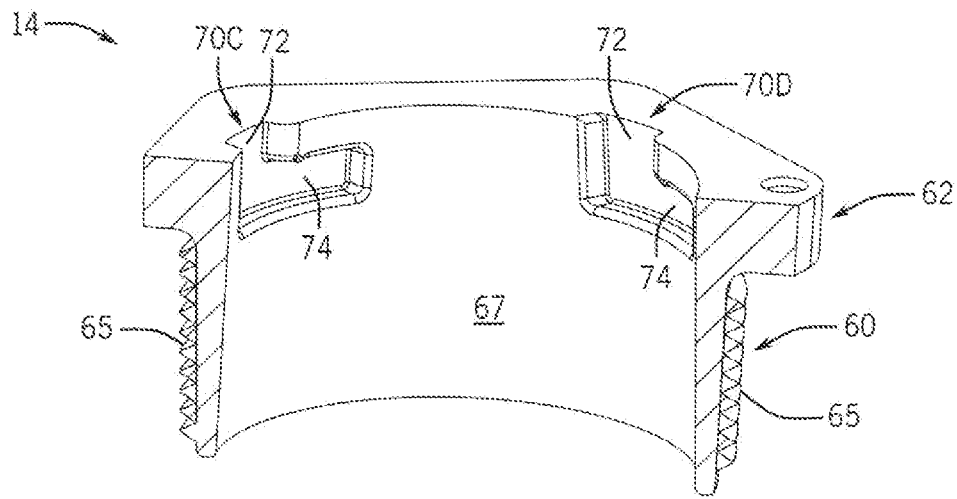
FIG. 23 is a cross sectional view of the adapter.

Turning to FIGS. 18 to 23, the adapter 14 has a generally circular, tubular configuration for mating with the circular fill port 16 of a tank or container 18. The adapter 14 has a lower portion 60 and an upper portion 62, forming a central aperture 64. The upper and lower portions 62 and 60, respectively, are preferably constructed in a unitary fashion. The adapter 14 is preferably constructed of polypropylene. The lower portion 60 has a tubular configuration. The outside surface 65 of the lower portion is threaded for mating with the threaded tank port 16, and the inside surface 67 is substantially smooth. The exterior surface 65 may be modified to mate with an alternative tank 18 port 16. For example, in the embodiment shown, the exterior surface 65 has two (2.0) inch male National Pipe Threads (NPT). But the exterior surface could be 1.5-inch NPT, 2.0-inch British Standard Pipe (BSP) threads, Buttress threads, among other connection means. The upper portion 62 is arranged as a flange on the upper end of the lower portion 60 and has plural flat sides 63 for engagement with and turning by a wrench or other tool. The flange like upper portion 62 has a diameter greater than that of the tank port 16 whereby it serves to form a seal between the sensor interface system 10 and the tank 18 when deployed. As is best shown in FIGS. 18 and 21, a plurality of slots 70 A-D, preferably four (4), are disposed around the periphery of the central aperture 64. The slots 70A-D have an L-shaped configuration with a vertical channel member 72 and a horizontal channel member 74. The channels 72/74 of the slots 70A-D have dimensions that correspond to the dimensions of the tabs 50A-B of the lower portion 48 of the lower member 32 of the sensor interface box 20.

Although the adapter 14 has been shown and described as a male type threaded connection member for connection to a female type threaded connection to a port 16 of a tank 18, it is within the purview of the invention that alternative adapter configurations and arrangements may be used for other containers and access ports. Further, it is within the purview that the adapter 14 can be modified to be a bracket or other mounting method provided it uses a universal interlock mechanism utilizing the tab and slot arrangement of the adapter.

FIGS. 5 and 7-13 show all of the elements and components of the sensor interface system 10 coupled together outside of a tank 18. The sensor interface assembly 12 is disposed so that the transducer 22 is disposed through the central aperture 64 of the adapter and is held by the cable 24, The cable 24 is sealingly connected to the sensor interface box 20 by the grip 46. The lower portion 48 of the lower member 32 of the sensor interface assembly 12 has been inserted into the central aperture 64 of the adapter 14 whereby the tabs 50 of the lower portion are initially aligned with the vertical grooves of slots 70A-D and the sensor interface box is twisted to turn the tabs 50A-B into the horizontal grooves, whereby the sensor interface box 20 and adapter 14 are locked together. Sealing gasket 35 (FIG. 6A) is disposed between the sensor interface box 20 and the adapter 14.

Figures 2, 3, 4:
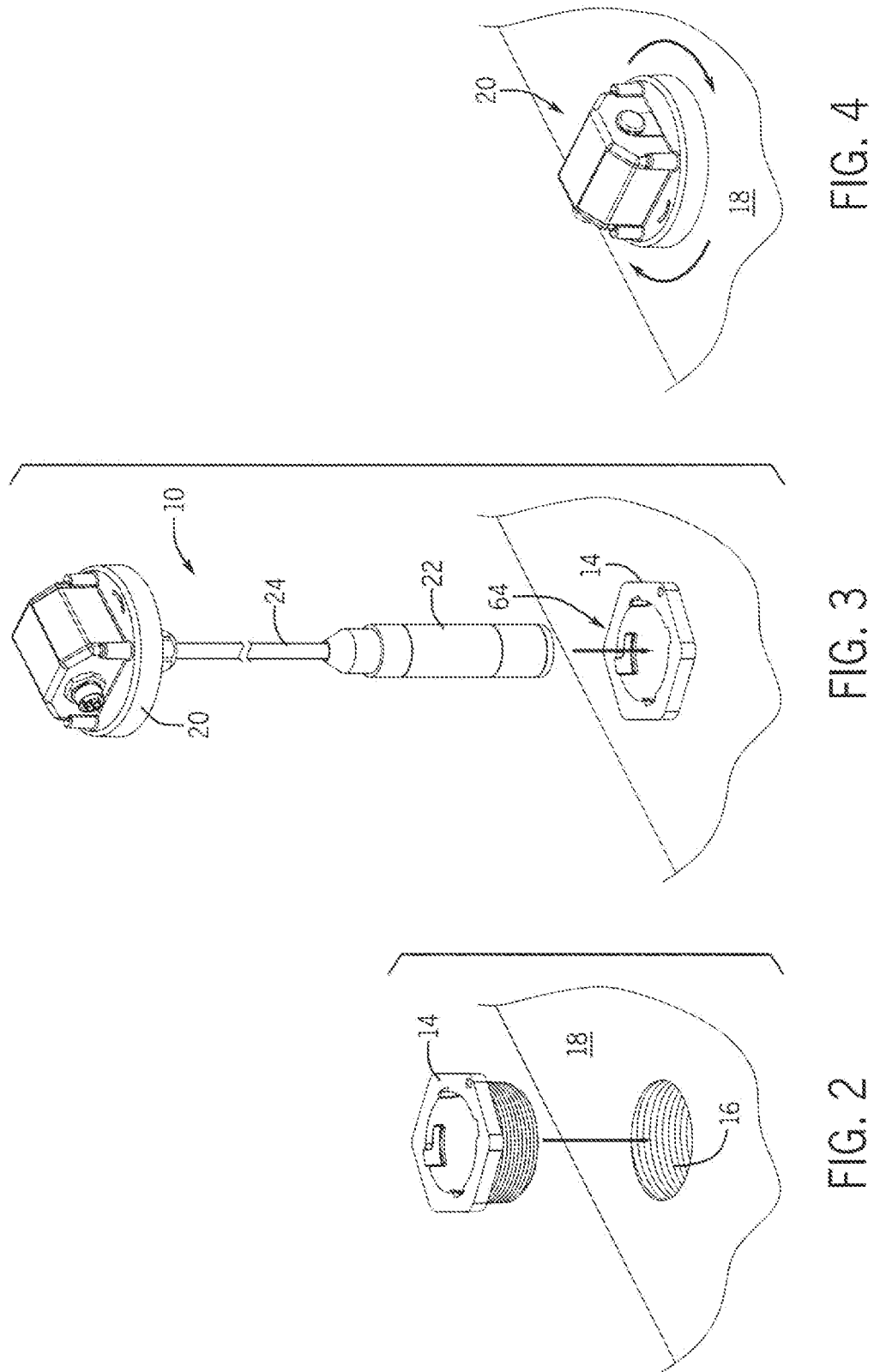
FIG. 2 shows an embodiment of a first step of an exemplary method of using the sensor interface system.
FIG. 3 shows an embodiment of a second step of an exemplary method of using the sensor interface system.
FIG. 4 shows an embodiment of a third step of an exemplary method of using the sensor interface system.

Referring to FIGS. 2, 3 and 4, the sensor interface system 10 is preferably used with a container which holds liquids, such as liquid tank 18. Tank 18 has a port 16 for connection of the sensor interface assembly 12 and for ingress of liquids to the interior of the tank. The sensor interface system 10 of the invention permits fast, easy, secure and safe removal of the sensor interface assembly 12 from the port 16 so that liquids may be introduced to the tank 18, or removal of liquids should the need arise. The sensor interface system 10 also permits fast, easy, secure and safe reconnection of the sensor interface assembly 12 to the tank 18 at the port 16.

A preferred method of use of the sensor interface system 10 involves a first step of attaching the adapter 14 to the port 16 by engaging the threaded portion 65 of the adapter 14 to the threaded interior of the port 16 and rotating the threaded adapter 14 until the adapter is securely fastened to the tank 18. Thereafter, the sensor interface assembly 12 is introduced into the tank 18 through the center aperture 64 of the adapter 14. First, the sensor 22 is oriented above the aperture 64 and slowly lowered through the aperture 64 and into the tank 18 interior. The tabs 50A-B on the bottom of the sensor interface box 20 are aligned with the adapter 14 slots 70A-D and brought into contact with each other. Thereafter, the sensor interface box 20 is turned, preferably clockwise, approximately ⅛ turn, which seals and locks the sensor interface box 20 to the adapter 14.

The sensor interface assembly 12 of the sensor interface system 10 is removed from the tank 18 by reversing the connection steps above. The twist to lock and twist to unlock arrangement of the sensor interface assembly 12 and adapter 14 of the sensor interface system 10 facilitates much faster and easier tank filling, without complete removal of the entire device, than systems currently know in the prior art.

Although the apparatus/method has been described in connection with the field of fuel tanks, it can readily be appreciated that it is not limited solely to such field, and can be used in other fields including, but not limited to any field utilizing liquids stored in tanks or other containers.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

Although the invention or elements thereof may by described in terms of vertical, horizontal, transverse (lateral), longitudinal. and the like, it should be understood that variations from the absolute vertical, horizontal, transverse, and longitudinal are also deemed to be within the scope of the invention.

The terms "couple," "coupled." "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable." and the like near the word "coupled," and the like does not mean that the coupling, etc. in question is or is not removable.

As defined herein, "approximately" can, in some embodiments, mean within plus or minus ten percent of the stated value. In other embodiments, "approximately." can mean within plus or minus live percent of the stated value. In further embodiments, "approximately" can mean within plus or minus three percent of the stated value. In yet other embodiments. "approximately" can mean within plus or minus one percent of the stated value.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

I claim:

1. A sensor system for monitoring the contents of a container for holding a material, the container including a fill port for filling of the container with the material, the sensor system comprising:
    a sensor assembly including:
        a sensor interface box provided in a closed and sealed configuration with an upper member fastened to a lower member, the sensor interface box further having a first connection interface extending from the lower member; and
        a transducer, the transducer communicatively connected to the sensor interface box by a cable; and
    an adapter configured to be coupled to the fill port of the container without the use of a tool, the adapter having a second connection interface, whereby the first connection interface of the sensor assembly and the second connection interface of the adapter are configured to couple and uncouple the sensor assembly to the adapter coupled to the fill port of the container to allow removal of the sensor assembly, with the sensor interface box and transducer connected together, from the adapter.

2. The sensor system of claim 1, wherein;
    the container is a rigid tank configured to contain a liquid; and
    the sensor assembly is configured to measure the fill level of the liquid in the tank.

3. The sensor system of claim 2, wherein the tank is configured to contain a liquid which is a chemical, an oil, a lubricant, or a combustible fuel.

4. The sensor system of claim 1, wherein the transducer is a pressure transducer.

5. The sensor system of claim 1, wherein the cable is a flexible electronic communication cable.

6. The sensor system of claim 1, wherein the upper member and the lower member of the sensor interface box are fastened together by screws with a gasket disposed between the upper member and the lower member to provide the sensor interface box with a waterproof seal between the upper member and the lower member.

7. The sensor system of claim 1, wherein the upper member includes a shroud portion configured to overhang mating surfaces of the upper member and the lower member.

8. The sensor system of claim 1, wherein the adapter includes:
    a tubular member for engagement with the fill port of the container, wherein an outside surface of the tubular member is threaded for rotatably mating with threads on an inside diameter of the fill port of the container; and
    a flange member connected to the tubular member.

9. The sensor system of claim 8, wherein the adapter tubular member has a threaded exterior surface for rotatably coupling and decoupling a threaded inside diameter of the fill port of the container.

10. The sensor system of claim 8, wherein the adapter flange member has an outside dimension greater than the inside diameter of the fill port of the container.

11. The sensor system of claim 10, wherein the adapter flange member has a plurality of flat outer surfaces that define a polygonal perimeter.

12. The sensor system of claim 8, wherein the second connection interface includes at least one slot, the at least one slot being formed in the flange member and the tubular member.

13. The sensor system of claim 12, wherein the at least one slot has an L-shaped configuration, and the at least one slot includes a vertical channel member and an interconnected horizontal channel member.

14. The sensor system of claim 1, wherein:
the first connection interface includes at least one tab; and
the second connection interface includes at least one slot for receiving the at least one tab to rotatably couple and uncouple the adapter and the sensor assembly.

15. The sensor system of claim 14, wherein:
the at least one tab of the first connection interface is disposed on the lower member;
the adapter includes a tubular member and a flange member, the flange member connected to the tubular member, and the tubular member for engagement with the fill port of the container; and
the at least one slot of the second connection interface is formed in the flange member and the tubular member.

16. The sensor system of claim 15, wherein the at least one slot has an L-shaped configuration, and the at least one slot includes a vertical channel member and an interconnected horizontal channel member, wherein the at least one tab on the first connection interface is configured to fit within the vertical channel member and rotate within the interconnected horizontal channel member to couple and uncouple the adapter and the sensor assembly.

17. The sensor system of claim 15, wherein there are two of the at least one tab and four of the at least one slot.

18. A material sensor system for a rigid tank, the rigid tank having a fill port for filling the rigid tank, the sensor system being deployable in the fill port, the system comprising:
a sensor assembly including:
a sensor interface box, the sensor interface box having a first connection interface extending downwardly from a lower surface thereof and including at least one tab; and
a transducer communicatively connected to the sensor interface box by a cable; and
an adapter configured to be connected to the fill port of the rigid tank without the use of a tool, the adapter having a second connection interface including at least one slot; and
whereby, when the adapter is coupled to the fill port of the rigid tank, the at least one slot of the adapter is configured for receiving the at least one tab to rotatably couple and uncouple the sensor assembly with respect to the adapter when the adapter is coupled to the fill port of the rigid tank upon rotation of the sensor interface box relative to the adapter without requiring removal of the adapter from the fill port of the tank.

19. A universal liquid fill level sensor system for a rigid tank having a liquid fill aperture for filling the rigid tank with liquid, the sensor system being deployable in the liquid fill aperture, the sensor system comprising:

a sensor assembly including:
a sensor interface box including an upper member and a lower member connected to the upper member, the sensor interface box having a first connection interface disposed on the lower member and including at least two radially-extending tabs; and
a transducer, the transducer communicatively connected to the sensor interface box by a cable; and
an adapter configured to be fixedly connected to the liquid fill aperture of the tank without the use of a tool, the adapter including a tubular member for engagement within the fill aperture of the container, and a flange member extending from an upper portion of the tubular member and configured to form a seal between the sensor assembly and the tank;
wherein:
the adapter has a second connection interface including at least four slots, each of the at least four slots having an L-shaped configuration, the L-shaped configuration including a vertical channel member and an interconnected horizontal channel member; and
the at least two radially-extending tabs of the sensor assembly are configured to be inserted axially into the vertical channel member of two of the four slots of the adapter and to be rotated within the interconnected horizontal channel member of the two of the four slots to couple and uncouple the adapter and the sensor assembly without requiring removal of the adapter from the rigid tank.

20. A method of coupling a sensor system to a container for monitoring the contents of the container for holding a material, the sensor system including a sensor interface box with an upper member fastened to a lower member, and the container including a fill port for filling of the container with the material, the method comprising:
attaching an adapter to the fill port of the container without the use of a tool, the adapter having a second connection interface;
introducing a first connection interface extending from the lower member of the sensor interface box into an aperture of the adapter, including introducing a transducer, communicatively connected to the sensor interface box by a cable, into the aperture of the adapter; and
coupling the upper member of the sensor interface box with the adapter by coupling the first connection interface of the sensor interface box with the second connection interface of the adapter.

21. The method according to claim 20, further comprising rotating the sensor assembly, including the upper member, with respect to the adapter to securely fasten the sensor assembly to the fill port of the container via the adapter.

* * * * *